(12) United States Patent
Mazoyer et al.

(10) Patent No.: US 11,891,104 B2
(45) Date of Patent: Feb. 6, 2024

(54) VEHICLE FOR AN INFANT

(71) Applicant: ID DEVELOPMENT LIMITED, Kowloon (HK)

(72) Inventors: Joseph Mazoyer, Lyons (FR); Philippe Bajard, Lyons (FR)

(73) Assignee: ID DEVELOPMENT LIMITED, Kowloon (HK)

( * ) Notice: Subject to any disclaimer, the term of this patent is extended or adjusted under 35 U.S.C. 154(b) by 0 days.

(21) Appl. No.: 17/663,859

(22) Filed: May 18, 2022

(65) Prior Publication Data

US 2023/0001975 A1 Jan. 5, 2023

(51) Int. Cl.
*B62B 7/04* (2006.01)
*B62B 9/24* (2006.01)
*B62K 9/02* (2006.01)
*B62K 21/02* (2006.01)
*B62K 21/12* (2006.01)

(52) U.S. Cl.
CPC .............. *B62B 7/042* (2013.01); *B62B 7/044* (2013.01); *B62B 9/24* (2013.01); *B62K 9/02* (2013.01); *B62K 21/12* (2013.01)

(58) Field of Classification Search
CPC ......... B62B 7/042; B62B 7/044; B62B 7/086; Y10T 74/20822; Y10T 74/792
See application file for complete search history.

(56) References Cited

U.S. PATENT DOCUMENTS

| | | | | | |
|---|---|---|---|---|---|
| 1,443,130 | A | * | 1/1923 | Hilpert | B62K 9/02 280/7.1 |
| 1,555,112 | A | * | 9/1925 | Forse | B62K 9/02 280/87.05 |
| 2,816,775 | A | * | 12/1957 | Costello | B62H 7/00 74/551.8 |
| 5,028,066 | A | * | 7/1991 | Garth | B62K 9/02 280/47.11 |
| 10,336,394 | B2 | * | 7/2019 | Fitzwater | B62B 7/044 |
| 10,933,938 | B2 | * | 3/2021 | Mazar | B62B 7/044 |
| 11,052,932 | B2 | * | 7/2021 | DeBry | B62B 7/042 |
| 2004/0031348 | A1 | * | 2/2004 | Chen | B62K 9/02 74/551.3 |

(Continued)

FOREIGN PATENT DOCUMENTS

| CN | 2303777 | Y | * | 1/1999 |
|---|---|---|---|---|
| CN | 2666769 | Y | * | 12/2004 |
| CN | 203681626 | | | 7/2014 |

(Continued)

*Primary Examiner* — Steve Clemmons
(74) *Attorney, Agent, or Firm* — Defillo & Associates, Inc; Evelyn A. Defillo

(57) ABSTRACT

The invention relates to a children's vehicle having a vehicle body (10) on which are mounted a front wheel (31) and at least one rear wheel (32), a steering sub-assembly (20) having a steering column (21) linked to the front wheel (31) and a handlebar (22), a seat (41) configured to accommodate a child, a safety element (50) configured to surround at least a first area of the child's body when it is installed on the seat (41), the handlebar (22) being removable between: a first configuration in which the handlebar (22) is remote from the safety element (50), and a second configuration in which the handlebar (22) is close to the safety element (50) and surrounds a second area of the child's body.

8 Claims, 2 Drawing Sheets

(56) References Cited

U.S. PATENT DOCUMENTS

2019/0210626 A1* 7/2019 Mazoyer .................. B62B 7/06

FOREIGN PATENT DOCUMENTS

| | | | | | |
|---|---|---|---|---|---|
| CN | 203681626 U | * | 7/2014 | | |
| CN | 105501355 A | * | 4/2016 | | |
| CN | 105539669 A | * | 5/2016 | | |
| CN | 208198692 U | * | 12/2018 | | |
| CN | 109398554 A | * | 3/2019 | ............. | B62K 13/00 |
| CN | 112498460 | | 3/2021 | | |
| CN | 112498460 A | * | 3/2021 | ............. | B62B 9/104 |
| EP | 3333057 | | 6/2018 | | |
| KR | 20090010265 U | * | 10/2009 | | |
| KR | 200448196 Y1 | * | 3/2010 | | |
| KR | 101469378 B1 | * | 12/2014 | | |
| KR | 101725020 B1 | * | 4/2017 | | |
| WO | WO-2018134500 A1 | * | 7/2018 | ............... | B62K 9/02 |

* cited by examiner

VEHICLE FOR AN INFANT

FIELD OF THE INVENTION

The invention relates to the technical field of vehicles for children, and in particular the field of convertible vehicles for small children.

BACKGROUND OF THE INVENTION

Convertible vehicles can be used in at least two distinct configurations.

Children's vehicles are already known in the state of the art, for example tricycles, comprising a seat on which a safety element is mounted to surround the body of a child. The safety element in particular makes it possible to prevent the child from falling out of the seat. This type of vehicle also comprises a handlebar intended to be grasped by the child, with or without the possibility of controlling the steering of the vehicle.

However, the children's vehicle as known from the state of the art has the defect of being very bulky when the vehicle is in operation and/or stored.

SUMMARY OF THE INVENTION

An object of the invention is to provide a children's vehicle that is compact while providing good protection for the child.

To this end, the object of the invention is a vehicle for children comprising a vehicle body on which are mounted:
  a front wheel and at least one rear wheel,
  a steering sub-assembly comprising a steering column linked to the front wheel and a handlebar,
  a seat configured to accommodate a child,
  a safety element configured to surround at least a first area of the child's body when it is installed on the seat,
  the handlebar having two configurations:
  a first configuration in which the handlebar is remote from the safety element, and
  a second configuration in which the handlebar is close to the safety element and surrounds a second area of the child's body.

The term "handlebar" is understood to mean a tube provided with handles controlling the steering of the vehicle, or at least comprising two branches arranged on either side of the steering column.

It is understood that the vehicle is a convertible vehicle. It can assume two distinct operational configurations, that is to say, two different configurations of the vehicle, used by the child while he is installed on the vehicle.

It is understood that in the first configuration, the handlebar does not surround the second area of the child's body.

The two different configurations of the handlebar allow a single element to be used to ensure the function of guiding the vehicle and the function of protecting the child. Indeed, when the handlebar is in the first configuration, the vehicle is better suited to a child who is able to use the handlebar to control the steering of the moving vehicle; when the handlebar is in the second configuration, the vehicle is better suited to a young child requiring body protection to prevent any potential fall of the child out of the seat. The handlebar that performs these two functions makes the whole vehicle compact and reduces the number of parts needed to manufacture the vehicle.

According to other optional features of the invention, taken alone or in combination:

The children's vehicle comprises attachment means configured to connect the handlebar and the safety element, so that they delimit a closed space in the second configuration.

As a result, the child sitting on the seat is better protected from a potential fall.

The attachment means comprise a protuberance and a cavity configured to receive the protuberance by snap-fastening, the protuberance and the cavity being arranged one on the handlebar and the other on the safety element.

The handlebar comprises two branches arranged on either side of the steering column, each branch being rotatably mounted about an axis of rotation substantially perpendicular to the steering column.

The axes of rotation of the branches are normal to planes that intersect one another.

Each branch therefore forms a non-right angle with the median plane of the vehicle. This makes it possible to bring the branches closer to the safety element in the second configuration of the handlebar. In addition, the branches can be arranged so that they are closer to the body of the child so that he can grasp them with his hands.

The handlebar is rotatably mounted on the steering column about a vertical axis of rotation, the vertical axis of rotation being included in the plane of symmetry of the vehicle body.

To do this, the handlebar may have a shape allowing both configurations. For example, the handlebar can have a half-circle or a crescent shape.

The child vehicle comprises a lock button configured to lock the handlebar in the first configuration or in the second configuration.

The lock button can be, for example, a push button arranged so that the movement of the handlebar is authorized when the button is actuated and the movement of the handlebar is locked when the button is released.

The children's vehicle comprises a backrest connected to the seat, the safety element comprising two arms having the shape of an arc arranged on either side of the backrest, each arm comprising an end provided with a protuberance.

The safety element is rotatably mounted on the backrest about a horizontal axis of rotation, the safety element being movable between a safety position and a retracted position.

It is understood that the safety position is a position where the safety element is capable of forming a closed space with the handlebar and that the retracted position is a position where the safety element is substantially in the plane of the backrest.

The rotation of the safety element is achieved, for example, by a ball joint.

The safety element is detachable from the vehicle for better compactness of the vehicle when it is stored, for example, by folding the backrest toward the seat.

BRIEF DESCRIPTION OF THE FIGURES

The invention will be better understood upon reading the description that follows, given solely by way of example and with reference to the appended drawings, in which.

DETAILED DESCRIPTION

Figure 1:
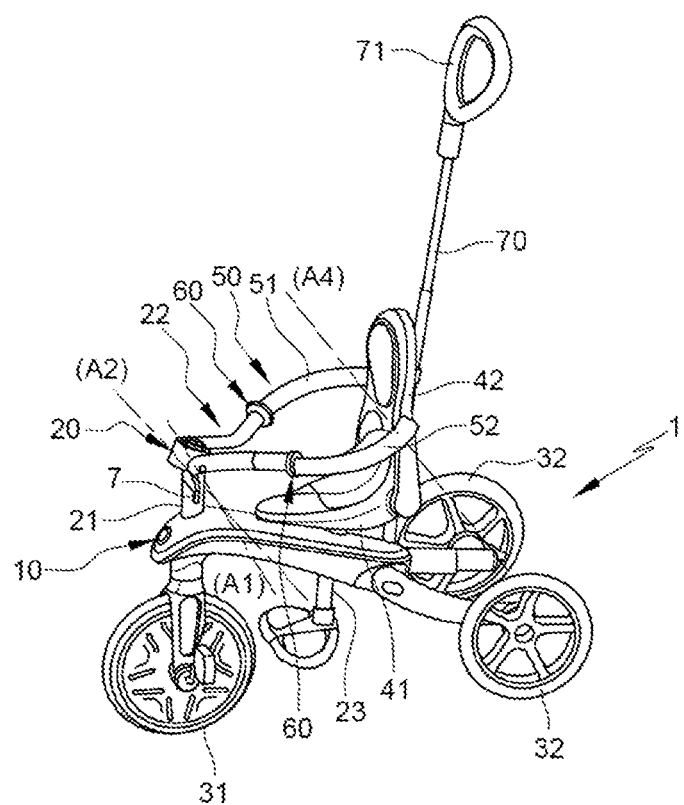
FIG. 1 is a perspective view of a children's vehicle comprising a handlebar in the second configuration.

FIGS. 1 to 4 show a children's vehicle, designated by general reference 1, according to one embodiment of the invention. The vehicle comprises a vehicle body 10 on which are mounted a front wheel 31 and two rear wheels 32 to form a tricycle. A steering sub-assembly 20 is arranged at the front of the vehicle and comprises a steering column 21 linked to the front wheel 31 and a handlebar 22. The children's vehicle 1 further comprises an operating rod 70 that is placed at the rear of the vehicle. The rod 70 comprises a control handle 71 for control of the vehicle by an accompanying adult. The rod 70 is engaged in a housing arranged at the rear of the vehicle body 10.

Figure 2:
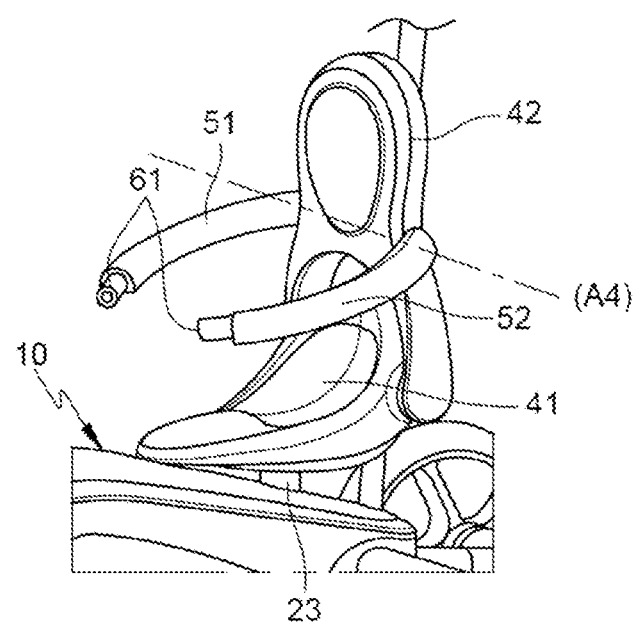
FIG. 2 is a perspective view of part of the children's vehicle of FIG. 1.

As illustrated in FIGS. 1 and 2, the vehicle comprises a seat 41 sized to receive a child, the seat 41 being connected to the vehicle body 10 by a mounting tube 23 passing through a hole provided on the vehicle body 10. A backrest 42 is rotatably mounted relative to the seat 41 and comprises a safety element 50 consisting of two arms 51, 52 having an arc shape arranged on either side of the backrest 42. Thus, the arms 51, 52 are capable of surrounding a first area of the child's body, for example an area encompassing the child's back and ribs, when he is installed on the seat 41.

In this illustrated embodiment, the arms 51, 52 are rotatably mounted on the backrest 42 about a horizontal axis of rotation (A4) and are movable between a safety position, as visible in FIGS. 1 and 2, and a retracted position, where the arms 51, 52 are rotated about the horizontal axis of rotation (A4) until they are substantially parallel to the backrest 42.

Figure 3:
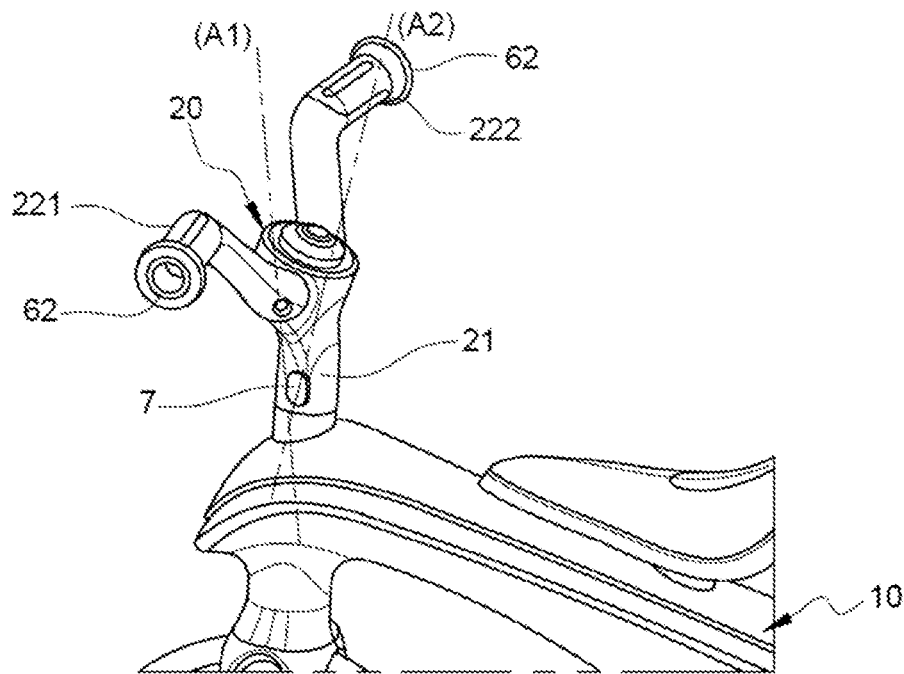
FIG. 3 is a perspective view of another part of the children's vehicle of FIG. 1.
Figure 4:
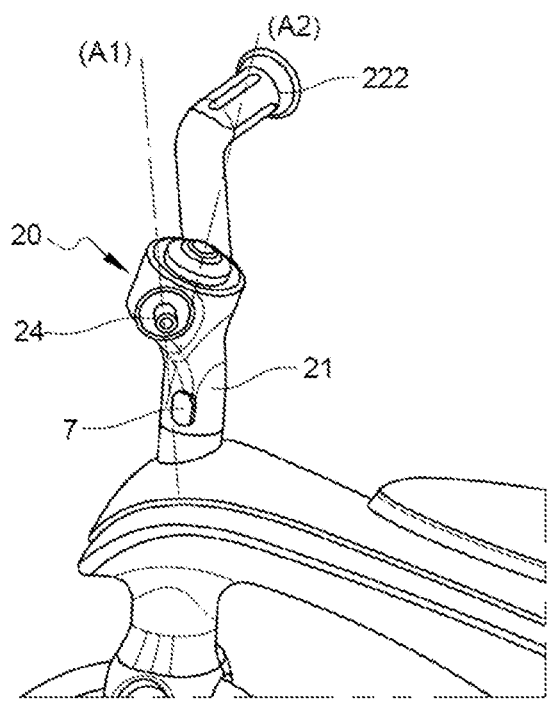
FIG. 4 is a perspective view of a detail of the handlebar.

FIGS. 1, 3 and 4 illustrate an embodiment of the handlebar 22 comprising two branches 221, 222 arranged on either side of the steering column 21. Each branch 221, 222 is rotatably mounted about an axis of rotation (A1, A2) substantially perpendicular to the steering column 21. Furthermore, the axes of rotation (A1, A2) are normal to planes that intersect one another. Therefore, the handlebar 22 formed by all the branches 221, 222 having two different configurations.

FIGS. 3 and 4 illustrate a first configuration in which the branches 221, 222 are remote from the arms 51, 52 and assume the form of a handlebar known from the state of the art; FIG. 1 illustrates a second configuration in which the branches 221, 222 are rotated about their axes of rotation (A1, A2) to a position where the branches 221, 222 are brought closer to the arms 51, 52 to form a closed loop with the latter to completely surround the child's body.

In order to keep the handlebar 22 in the second configuration, the children's vehicle 1 comprises attachment means 60 for attaching the handlebar 22 with respect to the safety element 50. In the illustrated example, each branch 221, 222 comprises one end provided with a cavity 62 intended to cooperate with a protuberance 61 arranged on the end of the corresponding arm. Other attachment means are also possible insofar as the connection and the separation of the handlebar 22 with respect to the safety element 50 can be done easily and quickly by a parent.

Furthermore, a lock button 7 is arranged on the steering column 21, as seen in FIGS. 1, 3 and 4, to lock the handlebar 22 in the first configuration or in the second configuration.

Finally, each branch 221, 222 of the handlebar 22 is mounted on a metal axle 24, as seen in FIG. 4, to solidify the connection between the branches and the steering column 21.

The invention is not limited to the embodiments described here, and other embodiments will become clearly apparent to a person skilled in the art. In particular, in another embodiment, the handlebar is rotatably mounted on the steering column about a vertical axis of rotation, the vertical axis of rotation being included in the plane of symmetry of the vehicle body. It is also possible to make the safety element 50 detachable from the vehicle.

LIST OF REFERENCES

1: children's vehicle
7: lock button
10: vehicle body
20: steering sub-assembly
21: steering column
22: handlebar
23: mounting tube
24: metal axle
31: front wheel
32: rear wheel
41: seat
42: backrest
50: safety element
51, 52: arms
60: attachment means
61: protuberance
62: cavity
70: rod
71: control handle
221, 222: branch
A1, A2: axis of rotation
A4: horizontal axis of rotation

The invention claimed is:

1. A vehicle for children comprising:
a vehicle body (10) on which are mounted:
a front wheel (31) and at least one rear wheel (32),
a steering sub-assembly (20) comprising a steering column (21) linked to the front wheel (31) and a handlebar (22),
a seat (41) configured to accommodate a child,
a safety element (50) configured to surround at least a first area of the child's body when it is installed on the seat (41),
the handlebar (22) having two configurations:
a first configuration in which the handlebar (22) is remote from the safety element (50),
a second configuration in which the handlebar (22) is close to the safety element (50) and surrounds a second area of the child's body;
wherein the handlebar (22) comprises two branches (221, 222) arranged on either side of the steering column (21), each branch (221, 222) being rotatably mounted about an axis of rotation (A1, A2) of the corresponding branch, substantially perpendicular to the steering column (21); and
wherein the axes of rotation (A1, A2) of the branches (221, 222) are normal to planes that intersect one another.

2. The vehicle according to claim 1, further comprising an attachment device (60) configured to connect the handlebar (22) and the safety element (50), so that they delimit a closed space in the second configuration.

3. The vehicle according to claim 2, wherein the attachment device (60) comprises a protuberance (61) and a cavity (62) configured to receive the protuberance (61) by snap-fastening, the protuberance (61) and the cavity (62) being arranged one on the handlebar (22) and the other on the safety element (50).

4. The vehicle according to claim 3, further comprising a backrest (42) connected to the seat (41), the safety element (50) comprising two arms (51, 52) having the shape of an arc arranged on either side of the backrest (42), each arm (51, 52) comprising an end provided with a protuberance (61).

5. The vehicle according to claim 4, wherein the safety element (50) is rotatably mounted on the backrest (42) about a horizontal axis of rotation (A4), the safety element (50) being movable between a safety position and a retracted position.

6. The vehicle according to claim 1, wherein the handlebar (22) is rotatably mounted on the steering column (21) about a vertical axis of rotation, the vertical axis of rotation being included in the plane of symmetry of the vehicle body (1).

7. The vehicle according to claim 1, further comprising a lock button (7) configured to lock the handlebar (22) in the first configuration or in the second configuration.

8. The vehicle according to claim 1, wherein the safety element (50) is detachable from the vehicle.

* * * * *